Nov. 1, 1927.

L. B. WAGGONER 1,647,324

HOSE COUPLING

Filed Oct. 10, 1925

Lloyd B. Waggoner, Inventor

Witnesses
C. C. Churchman Jr.

By Richard B. Owen

Attorney.

Patented Nov. 1, 1927.

1,647,324

UNITED STATES PATENT OFFICE.

LLOYD B. WAGGONER, OF SAN DIEGO, CALIFORNIA.

HOSE COUPLING.

Application filed October 10, 1925. Serial No. 61,728.

This invention relates to pipe fittings and has particular reference to a sectional coupling for pipe and hose sections.

An important object of the invention is to provide a pipe coupling which may be very quickly connected or disconnected and which will provide a tight joint.

A further object of the invention is to provide a coupling particularly intended for the connection of garden hose and the like.

A still further object of the invention is the provision of a pipe coupling which is of comparatively simple design yet durable and efficient in use.

Other objects and advantages of this invention will become apparent as the description progresses.

Figure 1:
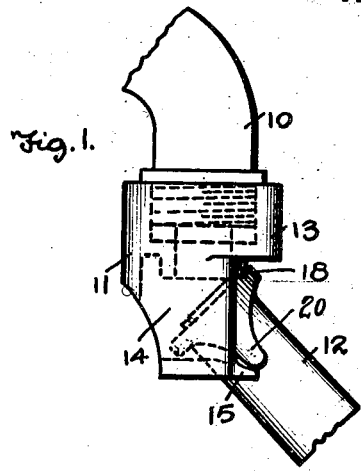
Figure 2:
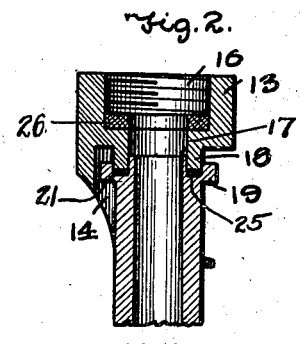
Figure 3:
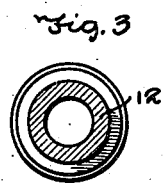
Figure 4:
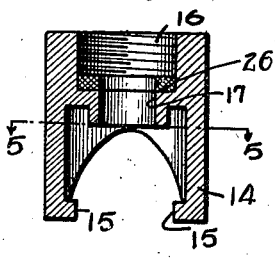
Figure 6:
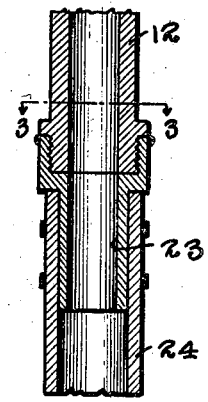
Figure 5:
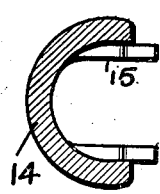

In the accompanying drawing forming a part of this specification and in which like numerals are employed to designate corresponding parts throughout the same:

Figure 1 is a side elevation of a coupling constructed in accordance with my invention in a partially connected position, Figure 2 is a central vertical sectional view through the coupling, Figure 3 is a transverse sectional view taken on the line 3—3 of Figure 2, Figure 4 is a central vertical sectional view through the female coupling section, Figure 5 is a transverse sectional view taken on the line 5—5 of Figure 4, and Figure 6 is a perspective view of the male coupling section.

In the drawing, wherein for the purpose of illustration is shown the preferred embodiment of my invention, the numeral 10 generally indicates the spout of a conventional type of faucet threaded for the connection of a suitable coupling member.

Referring now more particularly to the structure embodying my invention, the numeral 11 designates a female coupling section adapted to co-act with a male coupling section 12 to provide a detachable coupling. The female section 11 embodies a cylindrical body portion 13, and an arcuate downward extension which is cut away to form a substantially semi-circular extension 14 having an arcuate recess at the rear to facilitate the connection of the sections. Formed integral with the lower edges of the extension 14 are a pair of inwardly directed parallel ribs 15 slightly tapered at their forward extremities for engagement with the male section. The upper portion of the female section is provided with an internally threaded bore 16 engageable with the threaded end of on the faucet. The interior portion of the extension 14 is of a diameter to accommodate the male section, an annular collar 17 of reduced diameter being formed in the interior portion of the extension adjacent the upper end to provide an annular downwardly extending sleeve 18.

The male section embodies a tubular pipe section of any desirable length and having an annular flange 19 provided with longitudinal tapered lugs 20 formed on opposite sides of the pipe section. The sides of these lugs are curved, the ends of the lugs being rounded so as to permit the same to readily ride in engagement with the ribs 15 formed on the co-acting section. An intermediate annular groove 21 is formed in the upper end of the male section providing a cylindrical extension 22 engageable in the collar 17 formed on the female section 11. The lower extremity of the pipe section 12 is preferably externally screw threaded and provided a distance above its extremity with a flange of the usual type. This construction permits the connection of a common form of hose nipple indicated at 23 to which a hose 24 is secured.

It is to be noted, that while my improved coupling is especially intended to permit convenient connection of garden hose with the ordinary faucets, it is by no means limited to this particular application and may be advantageously employed wherever a readily separable coupling is desired.

In use, the female section 11 is connected to the outlet of a faucet, as shown in Figure 1. The complementary male section 12 is then tilted and inserted in the extension 14 formed on the lower end of the female section. The male section 12 is then swung to position in alinement with the female section thus locking the parts providing a firm and close fitting joint. To prevent leakage of the liquid about the joints, it is desirable to insert a suitable packing ring 25 in the groove 21 formed in the upper end of the male section, this packing ring being compressed by the downwardly projecting sleeve 18 to insure a tight connection. A similar packing ring or washer 26 may be positioned in the upper internally threaded bore 16 to secure a water pipe connection with the faucet. To uncouple the sections, it is merely necessary to swing the lower male section 12 in a direction away from the extension 14 and withdraw this member from the female section.

It is to be understood that the form of my invention herewith shown and described is to be taken as the preferred example of the same and that various changes as to the shape, size and arrangement of parts may be resorted to without departing from the spirit of the invention, or the scope of the subjoined claims.

Having thus described my invention, I claim:

1. A pipe coupling comprising a female section having, a downwardly projecting extension, a collar formed in the said section, and a pair of parallel ribs formed at the lower edges of the downwardly projecting extension; a co-acting tubular male section, an annular flange formed about one end of the male section, a pair of tapered lugs formed on the sides of the male section and integral with the annular flange and engageable with the ribs of the female section, the extremity of the male section being provided with an annular groove to receive the collar of the female section.

2. A pipe coupling comprising a pair of separable sections, one section including a body member having a threaded bore, the said member having a substantially semi-circular extension, a collar formed within the body, and a pair of parallel ribs upon the lower portion of the extension; a male section including a tubular body having an annular flange formed at one end, tapered lugs formed on opposed sides of the male section and integral with the annular flange, the said sections being adapted to be separably connected by angular movement of the male section with respect to the female section whereby the lugs of the male section are slidably engaged with the ribs of the female section to connect the sections in alignment.

3. A pipe coupling comprising a pair of separable coupling sections, one section including a body member having a threaded bore engageable with a faucet, an arcuate downward extension formed on the body member, a collar formed in the body member having a downwardly depending sleeve extension, a pair of parallel tapered ribs formed on the inner sides of the arcuate extension, a complementary section embodying a tubular body, an annular flange formed at one end of the body, a pair of tapered lugs having arcuate sides formed on opposed sides of the body adjacent the flange, said annular flange being provided with an annular groove to receive the end of the sleeve formed on the complementary section, the said sections being adapted to be separably connected by angular movement of the last section whereby the tapered lugs engage the ribs formed on the opposite section for tight connection of these members.

4. A pipe coupling comprising a female coupling section including a body member for connection with a faucet, an arcuate extension forming a continuation of the body member, transversely extending ribs formed at the lower inner edges of the arcuate extension in opposed positions, a reducing collar formed in the body and provided with a sleeve projecting toward the transverse ribs; and a coacting male section including a tubular body, an annular flange formed at one end of the tubular body recessed to provide an annular groove to receive the end of the sleeve on the female section, a pair of tapered lugs formed in opposed relation on the sides of the tubular body adapted for slidable engagement with the transverse ribs on the female section for adjustable connection of the sections.

In testimony whereof I affix my signature.

LLOYD B. WAGGONER.